United States Patent
Frederiksen et al.

(10) Patent No.: US 8,027,295 B2
(45) Date of Patent: Sep. 27, 2011

(54) APPARATUS, METHOD AND COMPUTER PROGRAM PRODUCT PROVIDING DYNAMIC SHARING OF RESOURCES BETWEEN UPLINK AND DOWNLINK ALLOCATIONS FOR SEPARATELY CODED USERS

(75) Inventors: Frank Frederiksen, Klarup (DK); Olav Tirkkonen, Helsink (FI)

(73) Assignee: Nokia Corporation, Espoo (FI)

( * ) Notice: Subject to any disclaimer, the term of this patent is extended or adjusted under 35 U.S.C. 154(b) by 402 days.

(21) Appl. No.: 12/008,277

(22) Filed: Jan. 9, 2008

(65) Prior Publication Data

US 2008/0259856 A1    Oct. 23, 2008

Related U.S. Application Data

(60) Provisional application No. 60/879,764, filed on Jan. 9, 2007.

(51) Int. Cl.
*H04W 4/00* (2009.01)
(52) U.S. Cl. ............ 370/329; 370/310.2; 370/341; 370/436; 370/437; 370/478; 455/422.1; 455/450; 455/509
(58) Field of Classification Search .......... 370/310.2, 370/328–339, 341, 349, 436–438, 478, 522, 370/524; 455/422.1, 450, 451, 452.1, 509, 455/515
See application file for complete search history.

(56) References Cited

U.S. PATENT DOCUMENTS

| | | | |
|---|---|---|---|
| 7,149,203 B2 | 12/2006 | Hsu et al. | 370/335 |
| 2005/0250486 A1* | 11/2005 | Malm | 455/422.1 |
| 2008/0049690 A1* | 2/2008 | Kuchibhotla et al. | 370/338 |
| 2008/0085718 A1* | 4/2008 | Kuchibhotla et al. | 455/452.1 |

FOREIGN PATENT DOCUMENTS

| | | |
|---|---|---|
| EP | 1 109 365 A1 | 6/2000 |
| WO | WO-2005/055527 A1 | 6/2005 |
| WO | WO-2007/132329 A2 | 11/2007 |

OTHER PUBLICATIONS

"Way forward on dowlink L1/L2 control signaling", TSG-RAN WG1 #47, R1-063580, Nov. 2006, 1 pg.
"Downlink L1/L2 control signaling", TSG-RAN WG1 #47, R1-063147, Nov. 2006, 8 pgs.
"Considerations on the CCE sharing for uplink and downlink allocation grants", 3GPP TSG RAN WG1 Meeting #50bis, R1-074320, Oct. 2007.
"Downlink L1/L2 control signaling", TSG-RAN WG1 #47, R1-063147, XP-002485753, Nov. 2006, 8 pgs.

* cited by examiner

*Primary Examiner* — Aung S Moe
*Assistant Examiner* — Hoon J Chung
(74) *Attorney, Agent, or Firm* — Harrington & Smith

(57) ABSTRACT

Apparatus, methods and computer program products operate an electronic device to generate downlink allocation information and uplink allocation to be signaled to other electronic devices operative in a wireless communications system; and to operate radio apparatus to signal the downlink allocation information and uplink allocation information in a control channel, wherein the downlink allocation information is signaled in a downlink allocation portion of the control channel and the uplink allocation information is signaled in an uplink allocation portion of the control channel. In a variant, apparatus, methods and computer program products operate an electronic device to receive downlink and uplink allocation information signaled in a control channel by a wireless communications system; and to search for downlink allocation information in the downlink allocation portion and uplink allocation information in the uplink allocation portion.

15 Claims, 4 Drawing Sheets

APPARATUS, METHOD AND COMPUTER PROGRAM PRODUCT PROVIDING DYNAMIC SHARING OF RESOURCES BETWEEN UPLINK AND DOWNLINK ALLOCATIONS FOR SEPARATELY CODED USERS

CROSS REFERENCE TO A RELATED UNITED STATES PATENT APPLICATION

This application hereby claims priority under 35 U.S.C. §119(e) from copending provisional U.S. Patent Application No. 60/879,764 entitled "APPARATUS, METHOD AND COMPUTER PROGRAM PRODUCT PROVIDING DYNAMIC SHARING OF RESOURCES BETWEEN UPLINK AND DOWNLINK ALLOCATIONS FOR SEPARATELY CODED USERS" filed on Jan. 9, 2007 by Frank Frederiksen and Olav Tirkkonen. This preceding provisional application is hereby incorporated by reference in its entirety.

TECHNICAL FIELD

The exemplary and non-limiting embodiments of this invention relate generally to wireless communication systems, methods, devices and computer program products and, more specifically, relate to techniques to provide control channel signaling between a user equipment and a wireless network node.

BACKGROUND

Various abbreviations found in the specification are defined as follows:
3GPP third generation partnership project
LTE long term evolution
OFDMA orthogonal frequency division multiple access
UTRA universal territory radio access
UE user equipment
Node-B base station
eNB evolved Node-B
DL downlink (Node B to UE)
UL uplink (UE to Node B)
MCS modulation and coding scheme
SC-FDMA single carrier, frequency division multiple access
CCH control channel
CRC cyclic redundancy check
MBMS multimedia broadcast and multicast service A proposed communication system known as evolved UTRAN (E-UTRAN, also referred to as UTRAN-LTE or as 3.9G/LTE) is currently under discussion within the 3GPP. The current working assumption is that the DL access technique will be OFDMA, and the UL technique will be SC-FDMA.

Currently, a control channel concept for separately coding the resource allocation signaling is under discussion. At a 3GPP RAN1 meeting (RAN1#47, Riga, Nov. 6-10, 2006) it was decided to use the following assumptions for the control channel for DL control signaling (see TSG-RAN WG1 #47, R1-063580, "Way forward on downlink L1/L2 control signaling"):
downlink control signaling is located in the first n OFDM symbols of a sub-frame;
n<3;
data transmission in the downlink can, at the earliest, begin at the same OFDM symbol as the control signaling ends;
multiple control channels are used;
each control channel is convolutionally coded;
a UE monitors a number of control channels;
one control channel carries information for one MAC ID;
at least two formats (MCS) for control signaling is supported; and
the power setting of each control channel is determined by the Node-B.

Reference may also be had, for example, to TSG-RAN WG1 #47, R1-063147, "Downlink L1/L2 control signaling".

Further, in LTE the multiplexing of MBMS may occur in several different ways. IN one technique unicast services (normal cellular operation) and MBMS are multiplexed in the time domain (TDM). The MBMS transmissions are such that the content is the same in multiple cells. That means that there would be certain sub-frames where there would be no cell-specific shared DL channel. Most of the DL resources in the sub-frame would be used to transmit MBMS data common to many cells. There would, however, be a cell-specific control channel transmitted even in MBMS sub-frames, and this control channel would possibly signal UL assignments and Ack/Nacks for UL transmission. For this reason, it is possible that cell-specific control channels in MBMS sub-frames may be smaller than in unicast sub-frames.

Of particular interest to the exemplary embodiments of this invention that are described below is the encoding structure of the control channel.

SUMMARY OF THE INVENTION

A first embodiment of the invention is an electronic device comprising: a radio apparatus configured to perform bidirectional communication operations in a wireless communications system; and a controller configured generate downlink allocation information, uplink allocation information and control channel division information; to operate the radio apparatus to signal in a control channel the downlink allocation information and uplink allocation information to other electronic devices operative in the wireless communications system, wherein the downlink allocation information is signaled in a downlink allocation portion of the control channel and the uplink allocation information is signaled in an uplink allocation portion of the control channel; and to operate the radio apparatus to signal the control channel division information, the control channel division information indicating how the control channel is divided between a downlink allocation portion and an uplink allocation portion.

A second embodiment of the invention is an electronic device comprising: a memory configured to store control channel division information, wherein the control channel division information indicates how a control channel is divided between a downlink allocation portion and an uplink allocation portion; a radio apparatus configured to perform bidirectional communication operations in a wireless communications system; and a controller configured to operate the radio apparatus to receive downlink and uplink allocation information signaled in a control channel by the wireless communications system, wherein the control channel is divided into a downlink allocation portion used for downlink allocation information and an uplink allocation portion used for uplink allocation information; to receive control channel division information indicating which portion of the control channel corresponds to the downlink allocation portion and which portion corresponds to the uplink allocation portion; and to search for downlink allocation information in the downlink allocation portion and uplink allocation information in the uplink allocation portion.

A third embodiment of the invention is a computer program product comprising a computer readable memory medium tangibly embodying a computer program, the computer program configured to operate an electronic device in a wireless communications system, wherein when the computer program is executed the electronic device is configured to generate downlink allocation information and uplink allocation to be signaled to other electronic devices operative in the wireless communications system; and to operate radio apparatus to signal the downlink allocation information and uplink allocation information in a control channel, wherein the downlink allocation information is signaled in a downlink allocation portion of the control channel and the uplink allocation information is signaled in an uplink allocation portion of the control channel.

A fourth embodiment of the invention is a computer program product comprising a computer readable memory medium tangibly embodying a computer program, the computer program configured to operate an electronic device in a wireless communications system, wherein when the computer program is executed the electronic device is configured to operate radio apparatus to receive downlink and uplink allocation information signaled in a control channel by the wireless communications network, wherein the control channel is divided into a downlink allocation portion used for downlink allocation information and an uplink allocation portion used for uplink allocation information; to receive control channel division information indicating which portion of the control channel corresponds to the downlink allocation portion and which portion corresponds to the uplink allocation portion; and to search for downlink allocation information in the downlink allocation portion and uplink allocation information in the uplink allocation portion.

A fifth embodiment of the invention is a method performed by an electronic device operative in a wireless communications system, the method comprising: generating downlink allocation information and uplink allocation to be signaled to other electronic devices operative in the wireless communications system; and operating radio apparatus to signal the downlink allocation information and uplink allocation information in a control channel, wherein the downlink allocation information is signaled in a downlink allocation portion of the control channel and the uplink allocation information is signaled in an uplink allocation portion of the control channel.

A sixth embodiment of the invention is a method performed by an electronic device operative in a wireless communications system, the method comprising: operating radio apparatus to receive downlink and uplink allocation information signaled in a control channel by the wireless communications system, wherein the control channel is divided into a downlink allocation portion used for downlink allocation information and an uplink allocation portion used for uplink allocation information; receiving control channel division information indicating which portion of the control channel corresponds to the downlink allocation portion and which portion corresponds to the uplink allocation portion; and searching for downlink allocation information in the downlink allocation portion and uplink allocation information in the uplink allocation portion.

DETAILED DESCRIPTION

Figure 1:
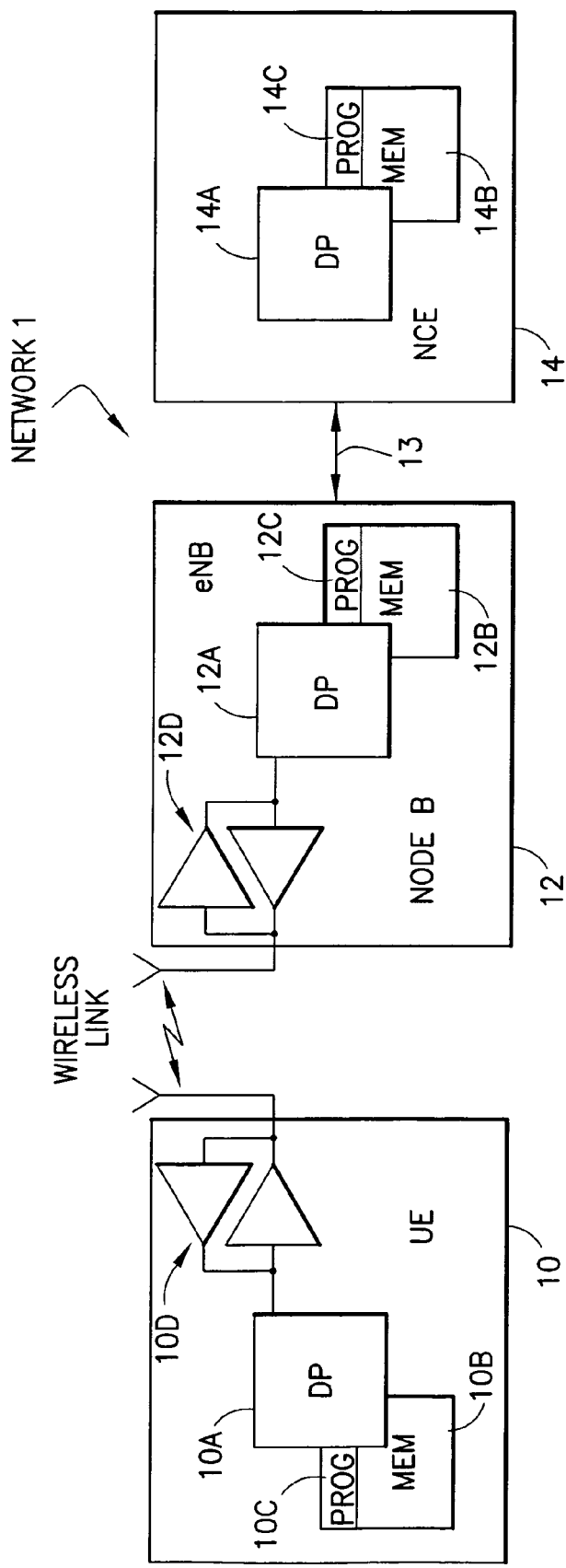
FIG. 1 shows a simplified block diagram of various electronic devices that are suitable for use in practicing the exemplary embodiments of this invention.

Reference is made first to FIG. 1 for illustrating a simplified block diagram of various electronic devices that are suitable for use in practicing the exemplary embodiments of this invention. In FIG. 1 a wireless network 1 is adapted for communication with a UE 10 via a Node B (base station) 12. The network 1 may include a network control element (NCE) 14, such as an access gateway (aGW). The UE 10 includes a data processor (DP) 10A, a memory (MEM) 10B that stores a program (PROG) 10C, and a suitable radio frequency (RF) transceiver 10D for bidirectional wireless communications with the Node B 12, which also includes a DP 12A, a MEM 12B that stores a PROG 12C, and a suitable RF transceiver 12D. The Node B 12 is coupled via a data path 13 to the NCE 14 that also includes a DP 14A and a MEM 14B storing an associated PROG 14C. At least one of the PROGs 10C and 12C is assumed to include program instructions that, when executed by the associated DP, enable the electronic device to operate in accordance with the exemplary embodiments of this invention, as will be discussed below in greater detail.

That is, the exemplary embodiments of this invention may be implemented at least in part by computer software executable by the DP 10A of the UE 10 and by the DP 12A of the Node B 12, or by hardware, or by a combination of software and hardware.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

The exemplary embodiments of this invention relate to the encoding structure of the control channel, and more specifically to enabling uplink and downlink allocations to efficiently share the same physical resources.

Figure 2:
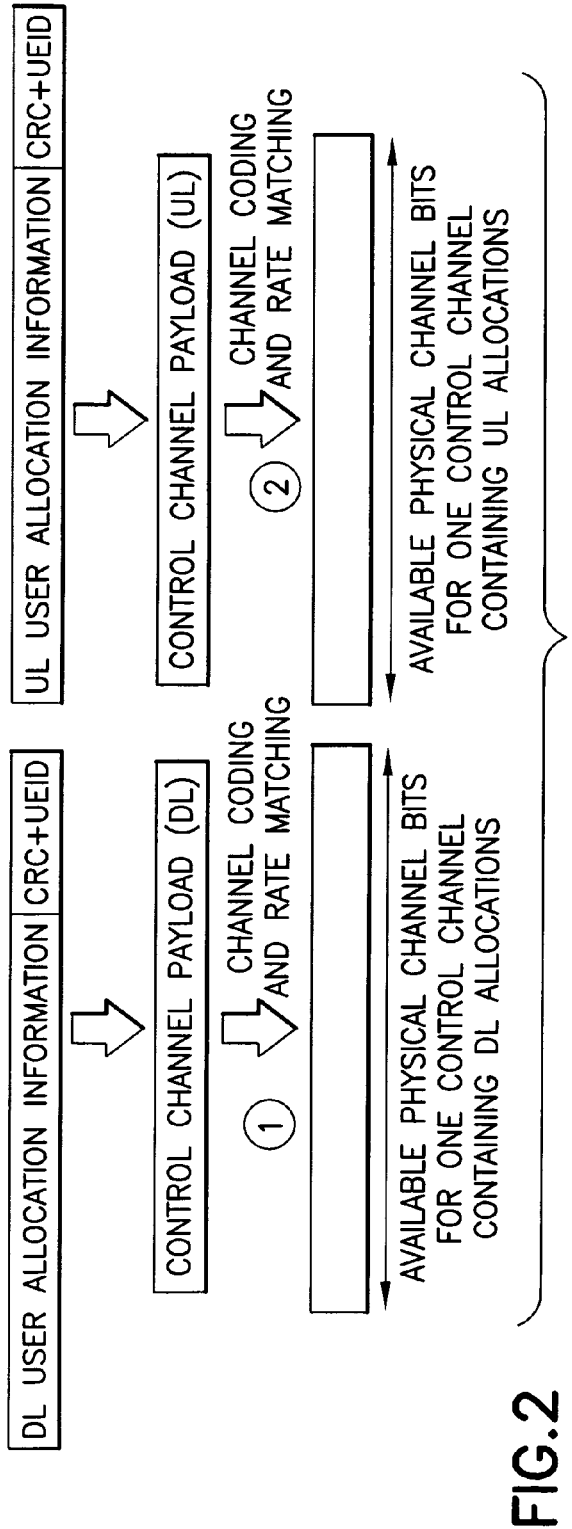
FIG. 2 shows a general principle of a coding structure for DL and UL allocations.

It is presently contemplated that there is a control channel payload that is signaled to a UE 10 that requires an allocation of resources. Reference may be had to FIG. 2, where the coding flow of a control channel is shown. It is also contemplated that the control channel structure includes a failure detection mechanism handled through an UEID (UE identification) and CRC operation/field.

More specifically, FIG. 2 illustrates a general principle of the coding structure for the downlink and uplink allocations. It should be noted that the control channel payloads for the uplink and downlink allocations may have sizes that may make transmission on the same sized physical segments an inefficient operation.

Consider a case where a difference in payload size for uplink and downlink constitutes a factor of approximately 2. In this non-limiting example two uplink allocations can take the place of a single downlink allocation (in terms of utilization of physical channel resources (e.g., the number of bits used in the physical channel)).

It may be assumed that if the factor of two could not be obtained one would need to construct two sets of allocation trees, one for uplink and one for downlink, and each of these would need to reserve resources according to worst case scheduling requirements.

In this regard one may appreciate that an additional issue that makes the worst case resource reservation an inefficient approach is that the physical channel resources are orthogonal in the sense that when time/frequency resources are not used, other users/control channels cannot reuse these resources (note that power may be shifted to other sub-carriers, but only to a limited extent).

The exemplary embodiments of this invention overcome these deficiencies by allocating the physical control channel signaling in such a manner that the resources are mapped to a sequence of available resources (which can be mapped/interleaved in time and frequency within the dedicated OFDM symbols used for control signaling). The mapping procedure operates so as to induce an order into the resources. This ordering is beneficial for distinguishing resources used for downlink allocations from those used for uplink allocations. For example, resources for downlink allocations may be allocated from one region or "end" of the resource domain, while the resources for uplink allocations are allocated from the another region, the (opposite) "end" of the resource domain.

Figure 3:
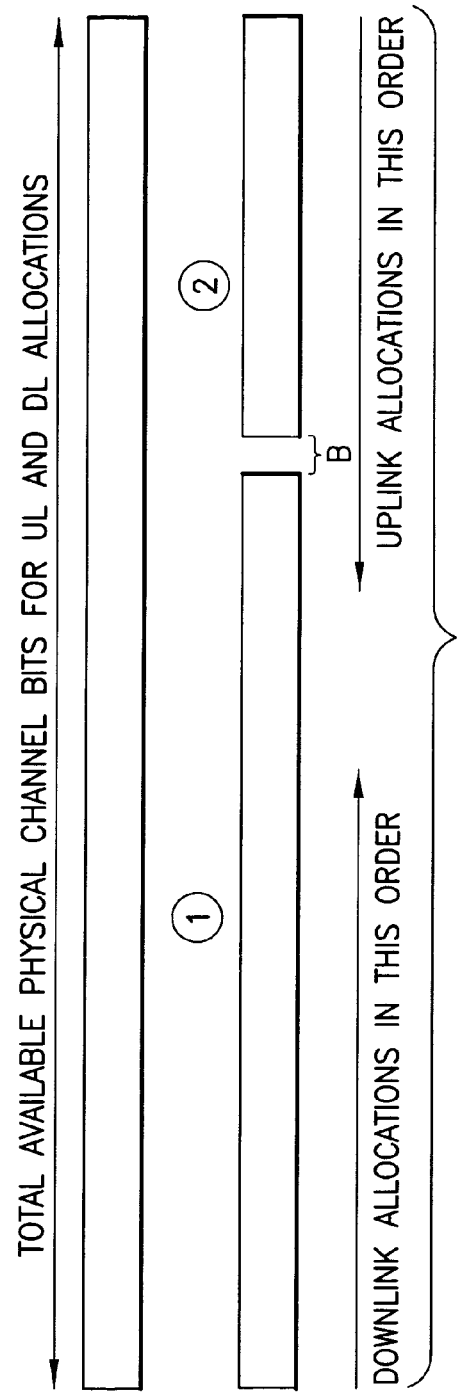
FIG. 3 illustrates a control channel allocation principle for DL and UL resource allocation is accordance with an exemplary embodiment of this invention.

Reference in this regard can be made to FIG. 3 for showing a non-limiting example of the allocation principle of the uplink and downlink resources for different control channels. It can be noted performance may be enhanced if the total number of available physical channel bits are mapped in such a way that the bits are interleaved in frequency, and preferably also in time, over the number of OFDM symbols that are assigned for the control channel.

In this manner it becomes possible to have a dynamic border (B in FIG. 3) between the uplink and downlink allocations, thus optimizing the utilization of the physical resources (less overhead is needed). The maximum number of bits possible for allocations in the uplink and the downlink, respectively, may be signaled to the UEs 10 in order to reduce the number of tests needed in the UE 10, as is described below in relation to FIGS. 4 and 5.

The exemplary embodiments of this invention may in principle be implemented in a number of ways, and the descriptions herein should be considered as non-limiting examples.

To explain, assume two sizes of control channels to indicate DL and UL allocations (marked with (1) and (2), respectively, in FIG. 2).

In FIG. 3 there is shown the physical resources available for the allocation information (e.g., up to the first three OFDM symbols). This set of physical resources represents a time and frequency interleaved control channel, such that the resources shown in FIG. 3 represent the resource assignments on a logical channel level. Then, as shown in the left-hand portion FIG. 3, the DL allocations are placed into the control channel structure (and potentially also for following the tree structure for allocations (in order to introduce adaptive coding of the control channel)). The UL allocations have a size that would make it difficult to fit these into the same size channel as for the DL, and thus the UL resource allocations are simply allocated from the right-hand side of the allocation resources. In this manner there is created a dynamic division of resources between the UL and DL control channels. This implies that in some cases one may schedule a large number of DL UEs 10, provided that there are relatively fewer UL scheduled UEs 10, and vice versa.

Figure 4:
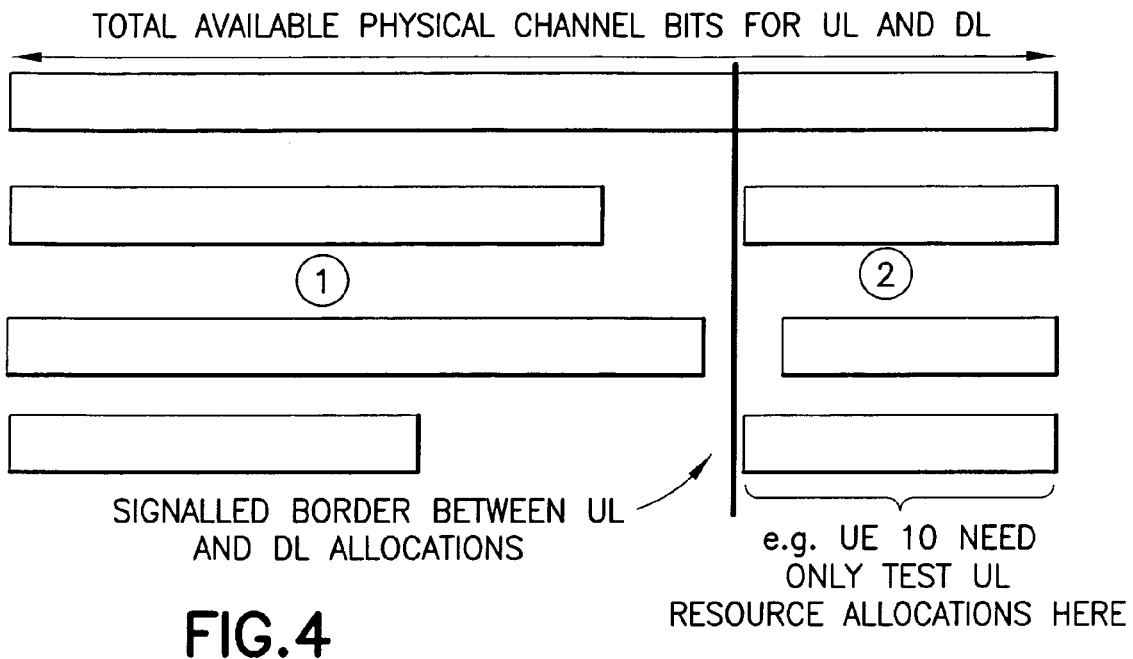
FIG. 4 presents an example of a signaling of a boundary between DL and UL resource regions in accordance with exemplary embodiments of the invention.

In one non-limiting embodiment of the invention the border between the UL and DL allocation resources may be signaled to the UEs 10, such as by the use of broadcast information, or by using some other method of out of band signaling. As a result the UE 10 needs to test only a portion of the CCH resources for UL allocations, and only a portion of the CCH resources for DL resources, as is shown in FIG. 4.

Figure 5:
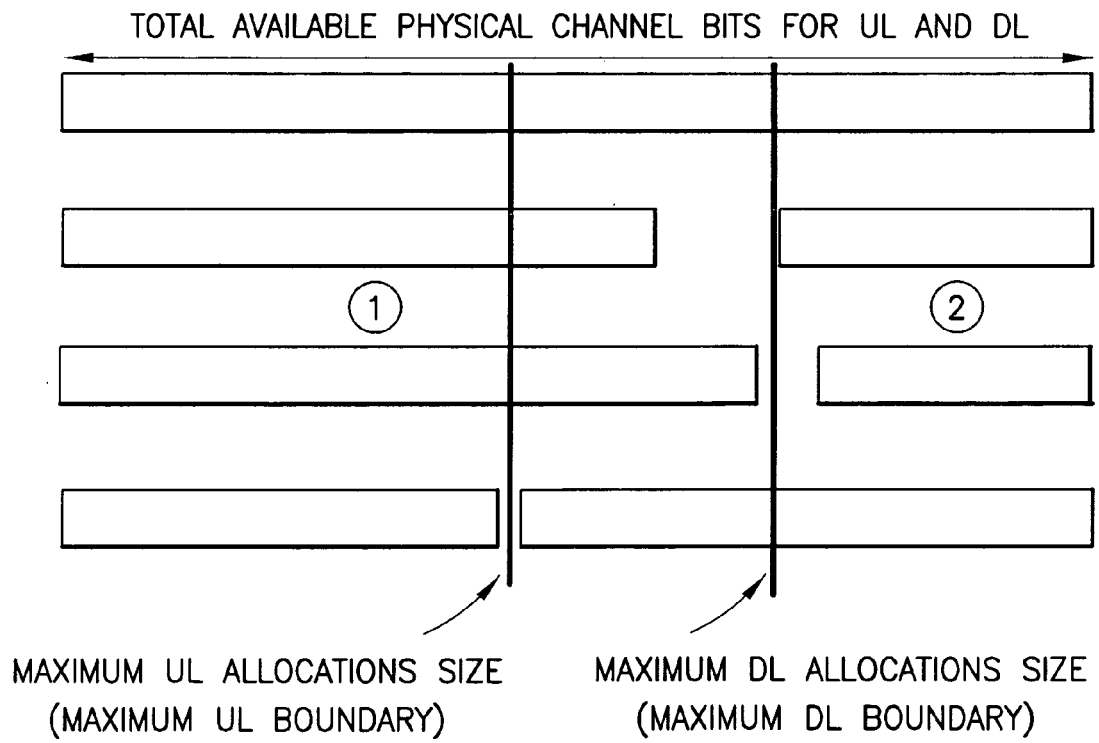
FIG. 5 presents an example of a signaling of maximum boundaries of DL and UL resource regions further in accordance with the exemplary embodiments of the invention.

In another non-limiting embodiment, and as is shown in FIG. 5, a maximum amount of resources (maximum boundary) that may be used only for UL allocations, and a maximum amount of resources (maximum boundary) that may be used only for DL allocations, are separately signaled to the UE 10. In this case a portion of the CCH resources may be used both for UL and DL allocations (i.e., that portion of the total available physical channel bits located between the DL allocation portion and the UL allocation portion). This provided even further flexibility to the CCH usage, with but a modest additional amount of testing being done at the UE 10.

It should be noted, however, that the indications of the maximum boundary or boundaries need not be signaled to the UE 10, so long as the value or values are made known by some technique to the UE 10. In general, the boundary-related value or values may be configured as a system parameter, or established by a specification (standard), or signaled directly to the UE 10. In exemplary and non-limiting embodiments the boundary-related value or values may be either a specification-define parameter(s) or cell-specific parameter(s).

Further, it should be appreciated that the maximum boundary sizes as disclosed herein may be defined as absolute values or as relative values. In the latter case, the maximum sizes would be, for example, given in relative numbers as compared to the total size of the control channel as indicated, for example, by the "n" first OFDM symbols of the sub-frame. Note further that the relative maximum sizes for UL and DL allocations may change at a different rate than the total size of the channel, and may be changed with a different signaling method.

In another exemplary embodiment of this invention, during a MBMS sub-frame the total number of the available physical channel bits for allocations depend on the maximum UL allocations size. That is, the maximum UL and DL allocation sizes (two values, or a border defined by a single value) may be signaled for unicast sub-frames. In MBMS sub-frames, the total size of the channel is determined according to the unicast maximum UL allocations size. In particular, this can imply that fewer symbols at the beginning of a MBMS sub-frame would be used for cell-specific control channels.

It can be appreciated that the improved control channel structure in accordance with the exemplary embodiments of this invention reduces additional reservation overhead for the UL and DL CCHs, as the Node-B 12 is allowed to dynamically switch between the two resource allocations (within certain pre-configured limits).

Based on the foregoing it should be apparent that the exemplary embodiments of this invention provide a method, apparatus and computer program product(s) to provide for allocating physical control channel signaling such that resources are mapped to a sequence of available resources, which may be mapped/interleaved in time and frequency within dedicated OFDM symbols used for control signaling.

Figure 6:
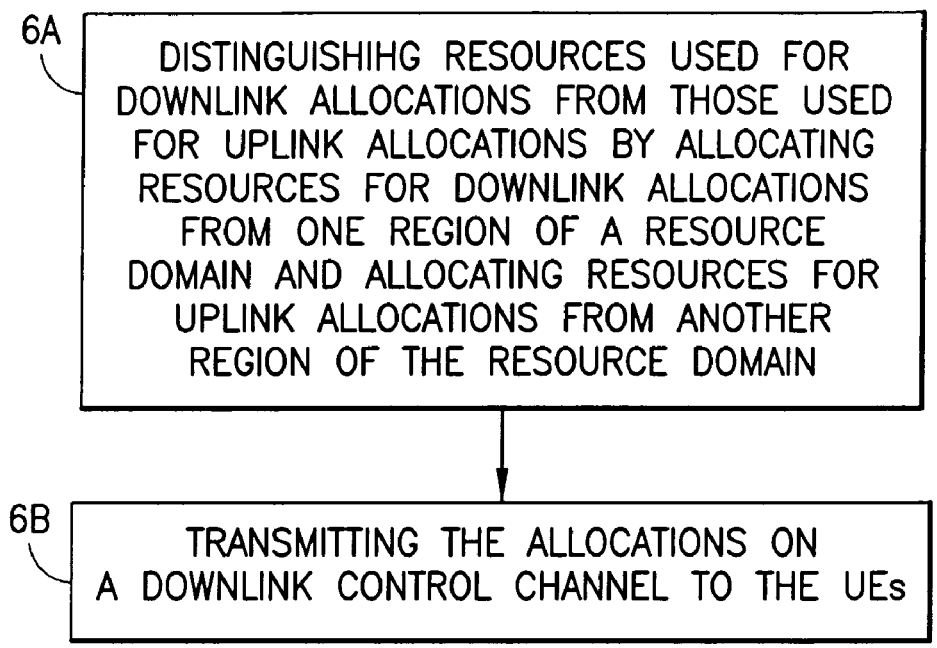
FIG. 6 is a logic flow diagram that depicts a Node-B method, and the execution of a computer program product, in accordance with exemplary embodiments of this invention.

Referring to FIG. 6, in accordance with a method, and a computer program product, executed by the eNB 12 resource allocations for UEs 10 are provided by: (Block 6A) distinguishing resources used for downlink allocations from those used for uplink allocations by allocating resources for downlink allocations from one region of a resource domain and allocating resources for uplink allocations from another region of the resource domain; and (Block 6B) transmitting the allocations on a downlink control channel to the UEs 10.

The method and computer program product as in the preceding paragraph, further comprising transmitting to the UEs one of a single indication of a boundary between the two resource domains, or a plurality of indications of multiple boundaries between the resource domains, such as a maximum boundary for DL allocations from the first domain, and a maximum boundary for UL allocations from the second domain.

The method and computer program product as in the preceding two paragraph, where a total number of available physical channel bits are mapped in such a way that the bits are interleaved in frequency and time over a number of OFDM symbols that are assigned for the control channel.

Figure 7:
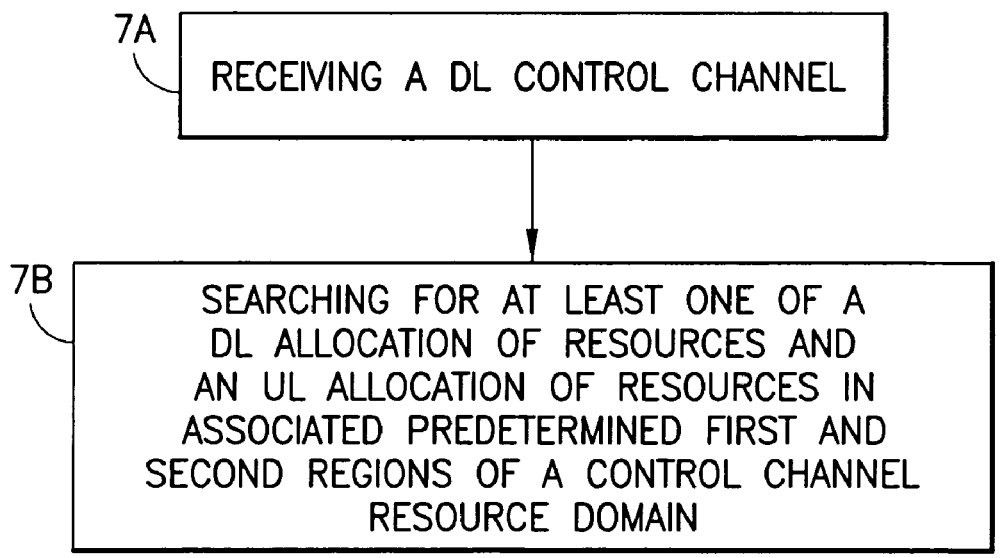
FIG. 7 is a logic flow diagram that depicts an UE method, and the execution of a computer program product, in accordance with exemplary embodiments of this invention.

Referring to FIG. 7, in accordance with a method, and a computer program product, executed by the UE 10: (Block 7A) receiving a DL control channel; and (Block 7B) searching for at least one of a DL allocation of resources and an UL allocation of resources in associated predetermined first and second regions of a control channel resource domain.

The method and computer program product as in the preceding paragraph, further comprising receiving DL signaling that specifies one of a single indication of a boundary between the first and second resource domains, or a plurality of indications of multiple boundaries between the first and second resource domains, such as a maximum boundary for DL allocations from the first domain, and a maximum boundary for UL allocations from the second domain.

Note that the various blocks shown in FIGS. 6 and 7 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. An electronic device comprising:
a memory configured to store control channel division information, wherein the control channel division information indicates how a control channel is divided between a downlink allocation portion and an uplink allocation portion; and
a controller configured to receive downlink and uplink allocation information signaled in the control channel by a wireless communications system, wherein the control channel is divided into the downlink allocation portion used for the downlink allocation information and the uplink allocation portion used for the uplink allocation information;
wherein the downlink allocation portion and the uplink allocation portion of the control channel have first and second ends, the first and second ends each corresponding to control channel resources comprising, in part, the control channel, wherein the first ends of the downlink allocation portion and the uplink allocation portion coincide with the first and second ends of the control channel, respectively, and wherein the downlink allocation information is signaled using control channel resources starting first with the control channel resources coincident with the first end of the control channel and the uplink allocation information is signaled using control channel resources starting first with the control channel resources coincident with the second end of the control channel; and to search for the downlink allocation information in the downlink allocation portion and the uplink allocation information in the uplink allocation portion.

2. The electronic device of claim 1 wherein the downlink and uplink allocation information is contained in OFDM symbols transmitted in the control channel.

3. The electronic device of claim 1 wherein the controller is further configured to receive control channel division information indicating which portion of the control channel corresponds to the downlink allocation portion and which portion corresponds to the uplink allocation portion.

4. The electronic device of claim 3 wherein the controller is further configured to receive the control channel division information by operating a radio apparatus to receive the control channel division information from the wireless communications network.

5. The electronic device of claim 3 wherein the control channel division information identifies a dynamic boundary between the downlink allocation portion and uplink allocation portion of the control channel.

6. The electronic device of claim 3 wherein the control channel division information identifies a first portion of the control channel that comprises the downlink allocation portion of the control channel; a second portion that comprises the uplink allocation portion of the control channel; and a third portion that may be used either for the downlink allocation information or the uplink allocation information.

7. The electronic device of claim 6 wherein respective dimensions of the first, second and third portions of the control channel are time-varying.

8. The electronic device of claim 3 wherein the controller is further configured to receive the control channel division information by retrieving the control channel division information from the memory.

9. A computer program product comprising a non-transitory computer readable memory medium tangibly embodying a computer program, the computer program configured to operate an electronic device in a wireless communications system, wherein when the computer program is executed the electronic device is configured to:

receive downlink and uplink allocation information signaled in a control channel by the wireless communications system, wherein the control channel is divided into a downlink allocation portion used for the downlink allocation information and an uplink allocation portion used for the uplink allocation information;

wherein the downlink allocation portion and uplink allocation portion of the control channel have first and second ends, the first and second ends each corresponding to control channel resources comprising, in part, the control channel; wherein the first ends of the downlink allocation portion and the uplink allocation portion coincide with first and second ends of the control channel, respectively, and wherein the downlink allocation information is signaled using control channel resources starting first with the control channel resources coincident with the first end of the control channel and the uplink allocation information is signaled using control channel resources starting first with the control channel resources coincident with the second end of the control channel; and to search for the downlink allocation information in the downlink allocation portion and the uplink allocation information in the uplink allocation portion.

10. A method comprising:

receiving at an apparatus downlink and uplink allocation information signaled in a control channel by a wireless communications system, wherein the control channel is divided into a downlink allocation portion used for the downlink allocation information and an uplink allocation portion used for the uplink allocation information;

wherein the downlink allocation portion and uplink allocation portion of the control channel have first and second ends, the first and second ends each corresponding to control channel resources comprising, in part, the control channel; where the first ends of the downlink allocation portion and the uplink allocation portion coincide with first and second ends of the control channel, respectively, and wherein downlink allocation information is signaled using control channel resources starting first with control channel resources coincident with the first end of the control channel and uplink allocation information is signaled using control channel resource starting first with control channel resources coincident with the second end of the control channel; and searching by the apparatus for the downlink allocation information in the downlink allocation portion and the uplink allocation information in the uplink allocation portion.

11. The method of claim 10, further comprising receiving at the apparatus control channel division information indicating which portion of the control channel corresponds to the downlink allocation portion and which portion corresponds to the uplink allocation portion.

12. The method of claim 11 wherein the control channel division information identifies a dynamic boundary between the downlink allocation portion and the uplink allocation portion of the control channel.

13. The method of claim 11, wherein the apparatus comprises radio apparatus, further comprising operating the radio apparatus to receive the control channel division information from the wireless communications system.

14. The method of claim 10 wherein the control channel division information identifies a first portion of the control channel that comprises the downlink allocation portion of the control channel; a second portion that comprises the uplink allocation portion of the control channel; and a third portion that may be used either for the downlink allocation information or the uplink allocation information.

15. The method of claim 14 wherein respective dimensions of the first, second and third portions of the control channel are time-varying.

* * * * *